United States Patent
Thrap

(10) Patent No.: US 7,180,726 B2
(45) Date of Patent: Feb. 20, 2007

(54) SELF-SUPPORTING CAPACITOR STRUCTURE

(75) Inventor: Guy Thrap, Del Mar, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 10/960,034

(22) Filed: Oct. 7, 2004

(65) Prior Publication Data

US 2006/0146480 A1 Jul. 6, 2006

Related U.S. Application Data

(60) Provisional application No. 60/525,483, filed on Nov. 26, 2003, provisional application No. 60/518,422, filed on Nov. 7, 2003.

(51) Int. Cl.
*H01G 9/00* (2006.01)
*H01G 5/38* (2006.01)

(52) U.S. Cl. ........................ 361/502; 361/522; 361/541; 361/329

(58) Field of Classification Search ................ 361/502, 361/522, 521, 517–519, 535–537, 538, 329–330, 361/513–515, 320, 301.4, 541
See application file for complete search history.

(56) References Cited

U.S. PATENT DOCUMENTS

| | | | |
|---|---|---|---|
| 5,142,439 A * | 8/1992 | Huggett et al. ........... 361/321.2 |
| 5,214,564 A * | 5/1993 | Metzler et al. ............. 361/699 |
| 5,493,472 A * | 2/1996 | Lavene ....................... 361/329 |
| 5,800,620 A * | 9/1998 | Rudder et al. ............ 118/723 I |
| 5,875,091 A * | 2/1999 | Rieken ........................ 361/328 |
| 6,115,270 A * | 9/2000 | Yamane et al. ................ 363/40 |
| 6,160,696 A * | 12/2000 | Bailey et al. ................ 361/115 |
| 6,222,715 B1 | 4/2001 | Gruhn |
| 6,259,595 B1 | 7/2001 | Hebel |
| 6,262,360 B1 | 7/2001 | Michel |
| 6,268,996 B1 * | 7/2001 | Landsgesell ................ 361/540 |
| 6,323,750 B1 | 11/2001 | Lampi |
| 6,326,761 B1 * | 12/2001 | Tareilus ....................... 318/722 |
| 6,424,514 B1 | 7/2002 | Boy |
| 6,611,421 B2 * | 8/2003 | Meadows et al. ........... 361/328 |
| 6,708,757 B2 | 3/2004 | Hebel |
| 6,710,996 B2 | 3/2004 | Bobert |
| 6,922,326 B2 * | 7/2005 | Kubota et al. ........... 361/274.1 |
| 2002/0093783 A1* | 7/2002 | Bendale et al. ............. 361/502 |

FOREIGN PATENT DOCUMENTS

JP 10-64771 * 3/1998
JP 2003-319665 * 11/2003

* cited by examiner

*Primary Examiner*—Eric W. Thomas
(74) *Attorney, Agent, or Firm*—Hensley Kim & Edgington, LLC

(57) ABSTRACT

A plurality of high capacitance capacitors are coupled to supply or accept large currents. Bus bars are welded to the capacitors to provide improved thermal performance as well as self-supporting rigidity to the geometrical structure formed by the capacitors and the bus bars.

28 Claims, 8 Drawing Sheets

SELF-SUPPORTING CAPACITOR STRUCTURE

RELATED APPLICATIONS

Figure 1A:
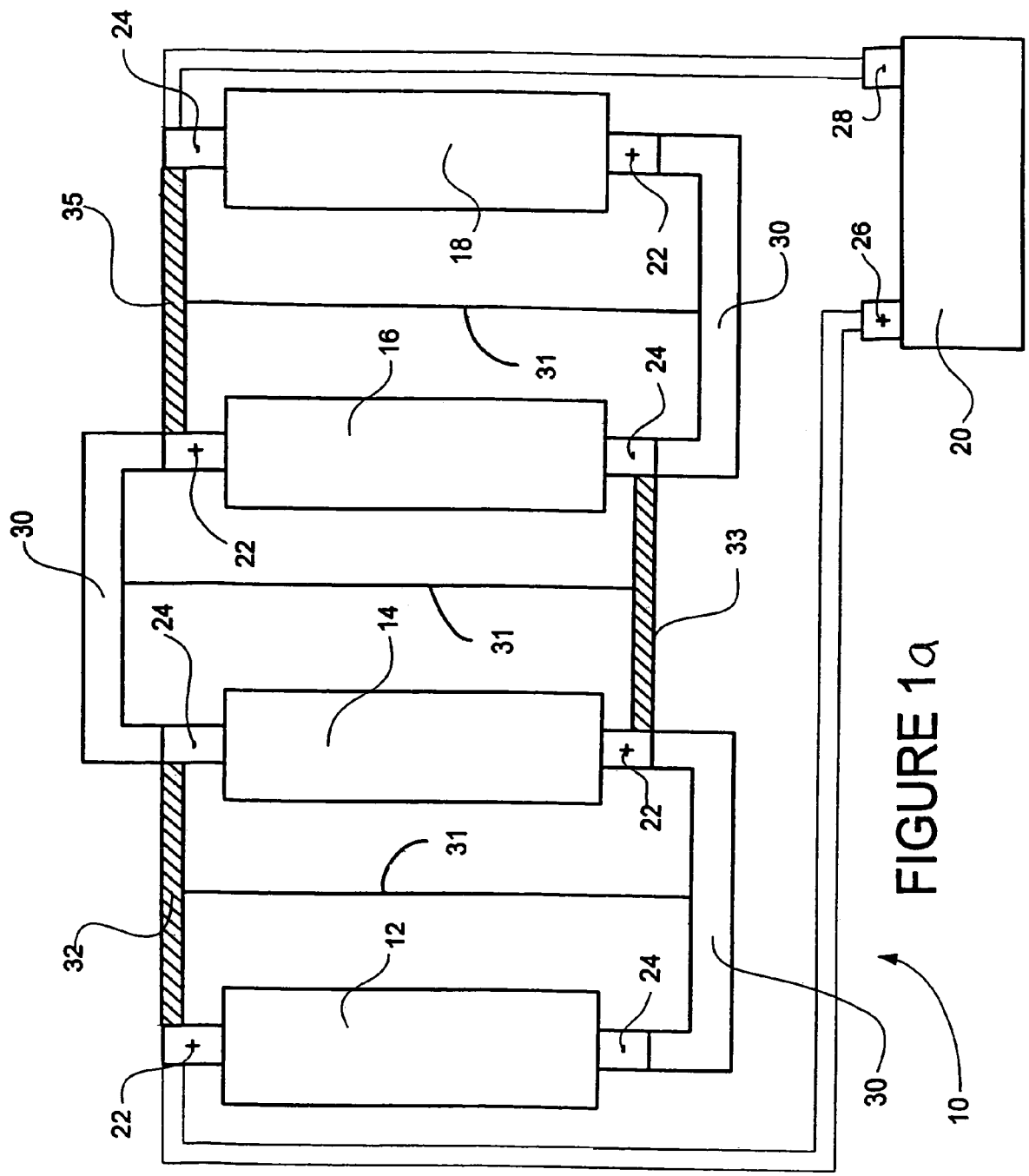

This application is related to and claims priority from U.S. Provisional Application No. 60/525,483 filed 26 Nov. 2003, which is commonly assigned and incorporated herein by reference; and This application is related to and claims priority from U.S. Provisional Application No. 60/518,422 filed 7 Nov. 2003, which is commonly assigned and incorporated herein by reference.

FIELD OF THE INVENTION

The present invention is related to interconnections made to capacitors in general, and to welded interconnections made to capacitors more particularly.

BACKGROUND

Known configurations for interconnection to capacitors include leads, tabs, and the like. Types of capacitor technology that use interconnections include ceramic capacitors, electrolytic capacitors, and other types that are know to those skilled in the art. Known capacitor interconnections utilize both radial and axial configurations. When current flow through such capacitors is small, the interconnections need not be large in diameter or cross-sectional area. Use of small geometrical sizes is allowed when maximum current is small.

Double-layer capacitors (also known as ultracapacitors and supercapacitors) can now be produced as individual capacitors and are capable of storing hundreds and thousands of farads in a single cell. Due in part to their large capacitance, double-layer capacitors can supply or accept large currents. However, single double-layer capacitor cells are limited by physics and chemistry to a maximum operating voltage of about 4 volts, and nominally to about between 2.5 to 3 volts. As higher capacitance double-layer capacitors are configured for use in increasingly higher voltage applications, even higher currents may be generated during charge and discharge of the capacitors.

What is needed, therefore, are reliable interconnections and methodologies for handling high current using double-layer capacitors.

SUMMARY

High capacitance capacitors can store large amounts of energy and are capable of supplying or accepting large currents. As current flow through a capacitor increases, heat may be generated. Above a certain threshold temperature or current, a capacitor may fail. The present invention addresses capacitor's tendency to fail at higher currents and/or higher temperatures.

In one embodiment, a capacitor-based system comprises at least three double-layer capacitors, the capacitors comprising terminals through which a high current may flow safely; and at least two bus bars, each bus bar comprising two attachment points, wherein at the two attachment points a double-layer capacitor and the bus bar form an integral structure which passes the high current. The high current may be greater than 2000 amps. The at least one bus bar may comprise a relatively ductile metal. The system may comprise a vehicle, the vehicle comprising an electrical device, wherein two of the terminals are coupled to the electrical device. The at least three capacitors may be interconnected in series and provide about 42 volts when charged. The at least three double-layer capacitors may be connected in series by the at least two bus bars. The bus bar may comprise an increased surface area. The increased surface area may comprise one or more rib. Between terminals of the at least three capacitors may be interconnected two capacitor balancing circuits. The least three capacitors and the at least two bus bars may comprise a self supporting-structure. The self-supporting structure may comprise welds. The welds may be laser welds. The welds may be ultrasonic welds. The welds may be cold formed. The two terminals may be disposed along one axis of each double layer capacitor. The terminals and the at least two bus bars may comprise the same metal.

In one embodiment, a method of using a plurality of capacitors, comprises the steps of: providing a first and a second double-layer capacitor; providing a first bus bar; and welding a first end of the first bus bar to the first double-layer capacitor to form a self-supporting structure; and welding a second end of the first bus bar to the second double-layer capacitor to form the self-supporting structure. The method may also comprise the step of passing a current of at least 250 amps through the first bus bar. The method may further provide a third double-layer capacitor; provide a second bus bar; and weld a first end of the second bus bar to the third capacitor to form the self-supporting structure; and weld a second end of the bus bar to the second capacitor to form the self-supporting structure. The method may also comprise the steps of: providing an electrical device; and coupling the double-layer capacitors to the electrical device to pass current between the capacitors and the electrical device. The electrical device may comprise a propulsion engine. The first and second capacitors may be connected by the bus bar in series. The self-supporting structures may be oriented in any orientation.

In one embodiment, a capacitor structure may comprise a plurality of capacitors; and a plurality of bus bars for carrying a current between the plurality of capacitors, wherein the plurality of bus bars and the plurality of capacitors form an integrally interconnected self-supporting structure. The one or more of the bus bars may comprise an increased surface area. The bus bars may be welded to the plurality of capacitors. The current may more than 250 amps. The capacitors may be double-layer capacitors. The capacitors may comprise terminals and the integral interconnected structure may be comprised of the bus bars and the terminals. The capacitors may comprise an aluminum housing and aluminum lid, wherein the housing and lid each comprise a terminal. The self-supporting structure may include at least one capacitor balancing circuit connected between two of the capacitors.

In one embodiment, a capacitor based system comprises at least two double-layer capacitors, the capacitors having axially disposed terminals through which current may flow safely; and at least one bus bar, the bus bar comprising two attachment points, the at least one bus bar for carrying the current between the double-layer capacitors, the at least one bus bar welded at the two attachment points to respective terminals of the double-layer capacitors. The at least one bus bar may comprise at least one void within which one of the terminals is disposed.

Other embodiments, benefits, and advantages will become apparent upon a further reading of the following Figures, Description, and Claims.

FIGURES

In FIG. 1a there are seen capacitors connected in series.

Figure 1B:
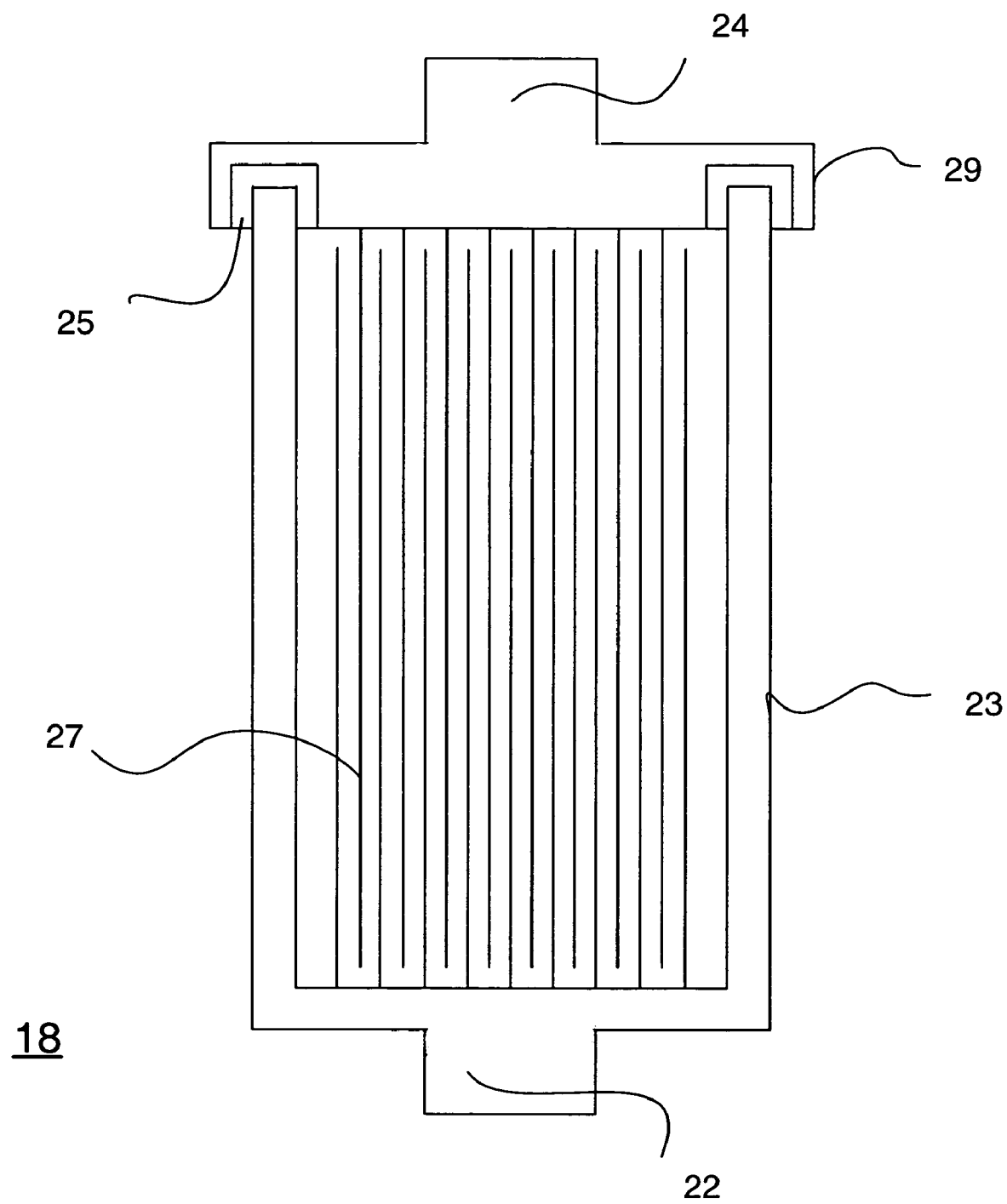

In FIG. 1b there is seen a structure of a double-layer capacitor.

Figure 2:
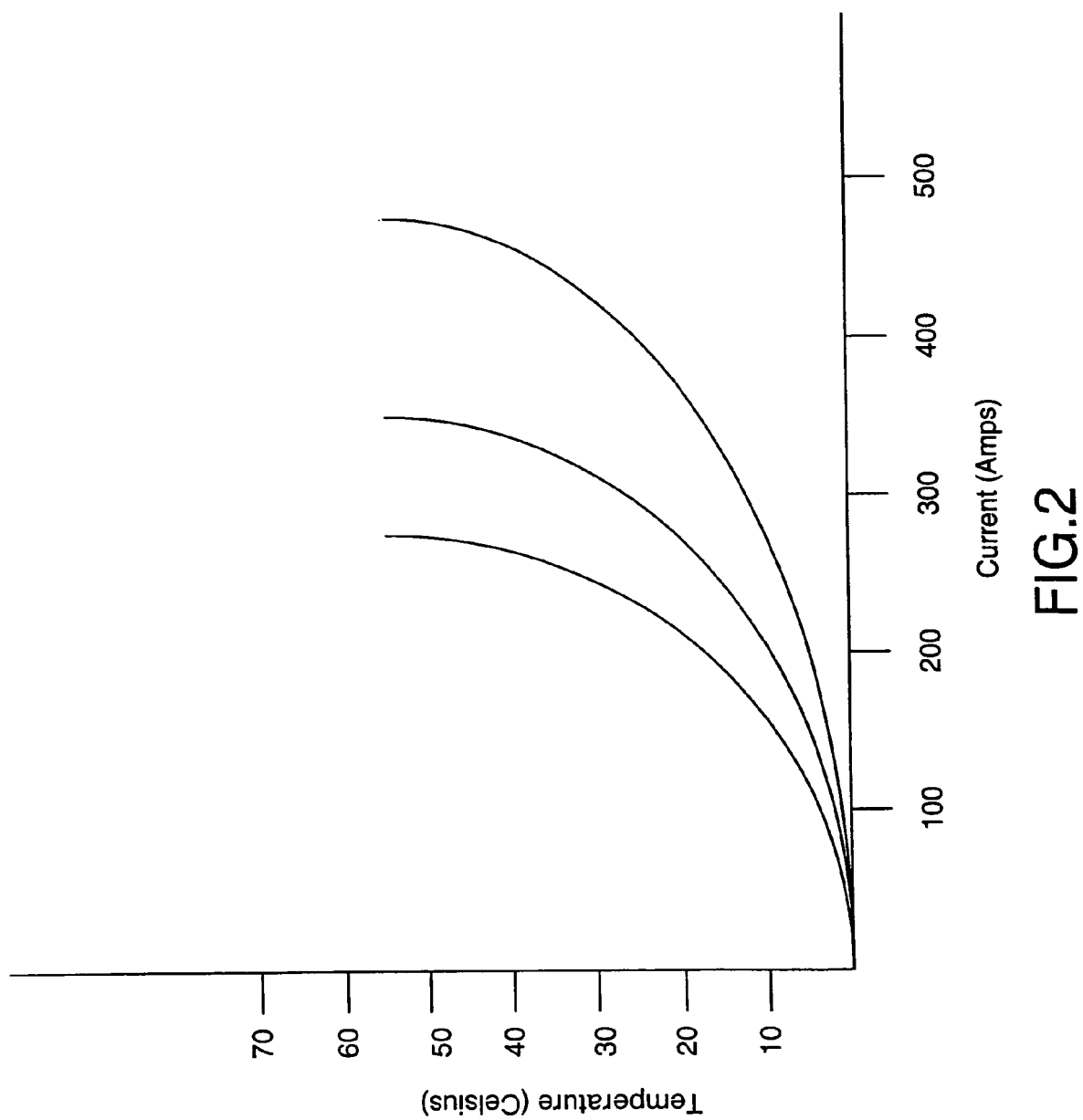

In FIG. 2 there are illustrated capacitor current vs. capacitor temperature curves.

Figure 3:
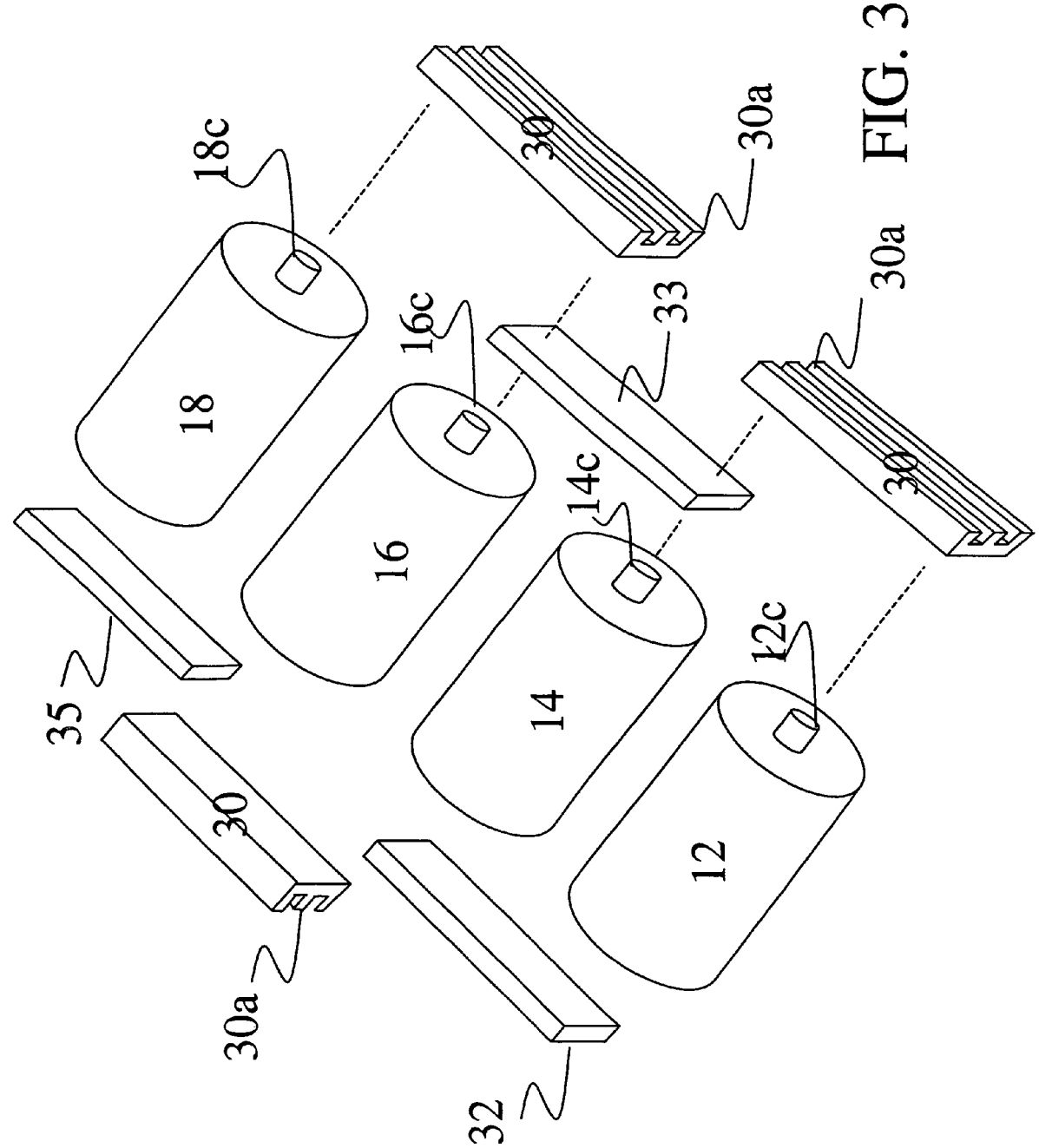

In FIG. 3 there are seen interconnections provided with increased surface area.

Figure 4:
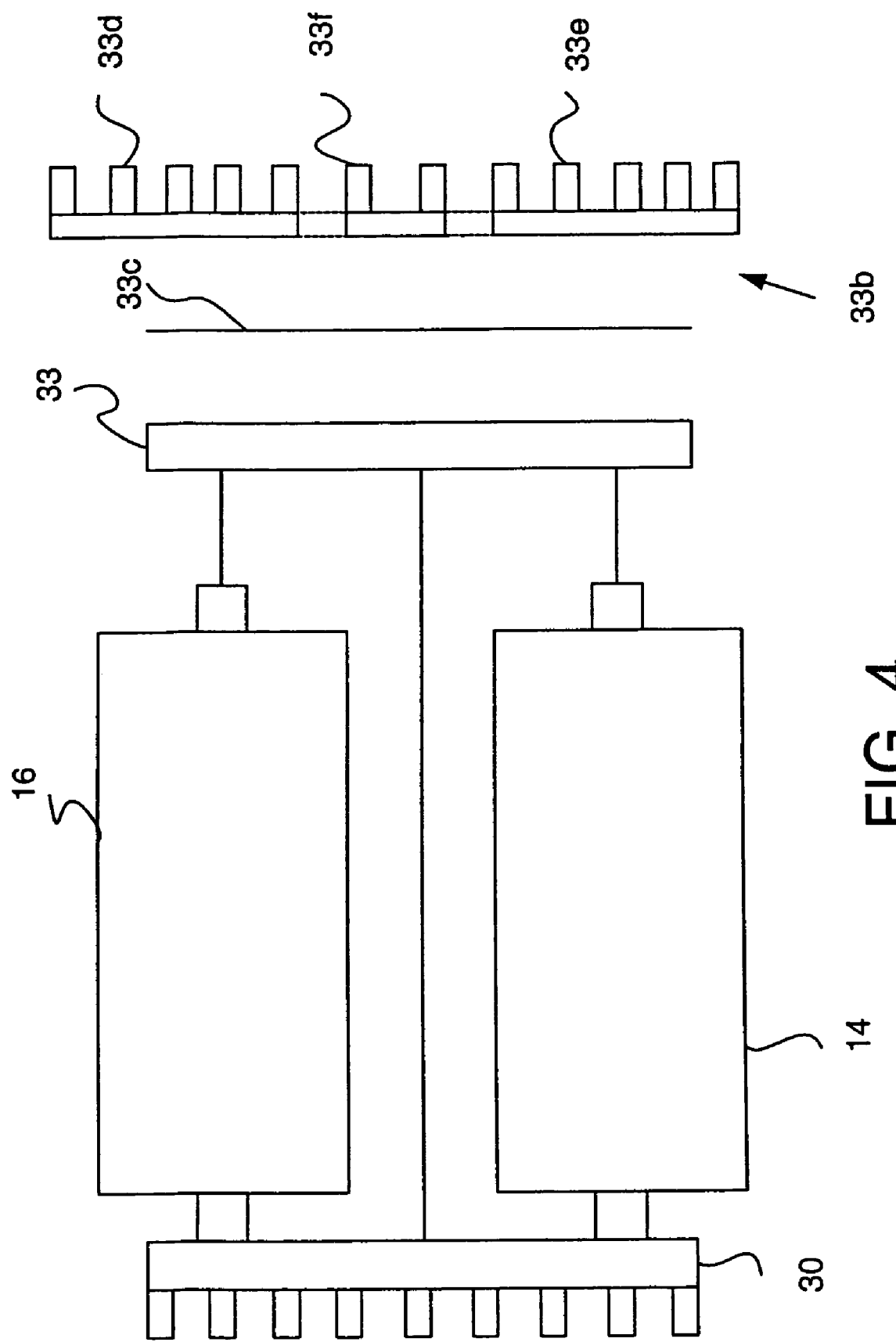

In FIG. 4 there is seen use of a cell balancing circuit.

Figure 5:
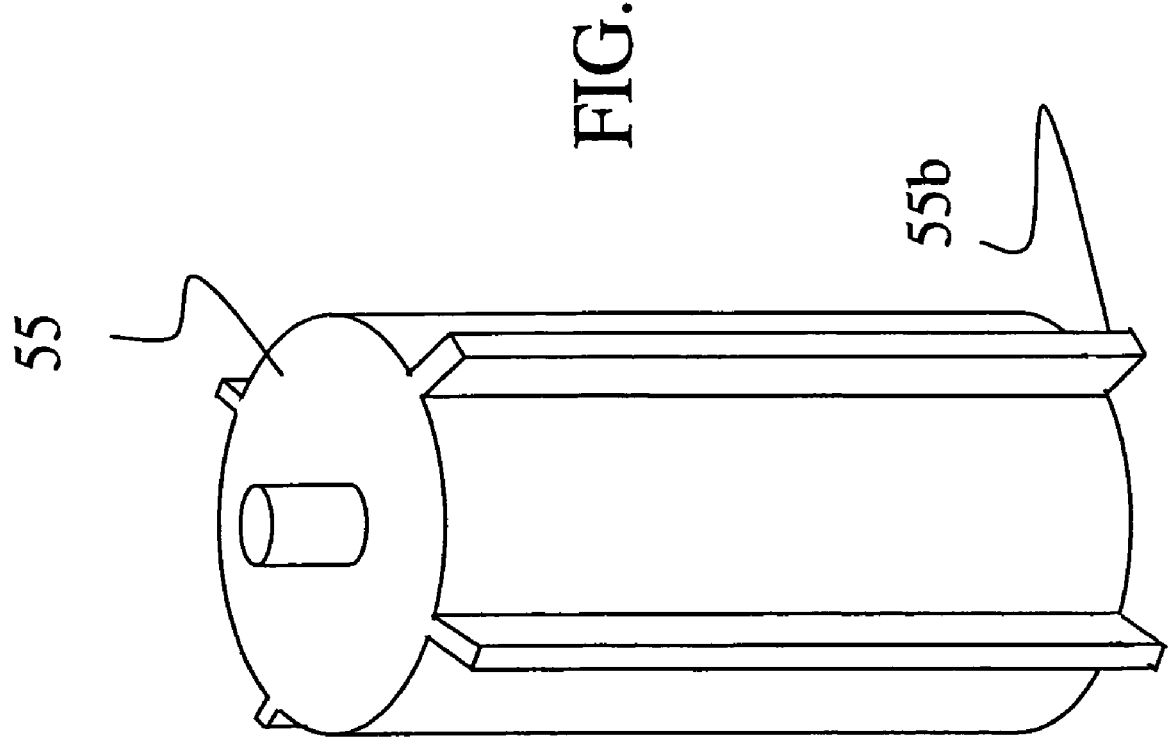

In FIG. 5 there is seen a capacitor housing configured to provide an increased surface area.

Figure 6:
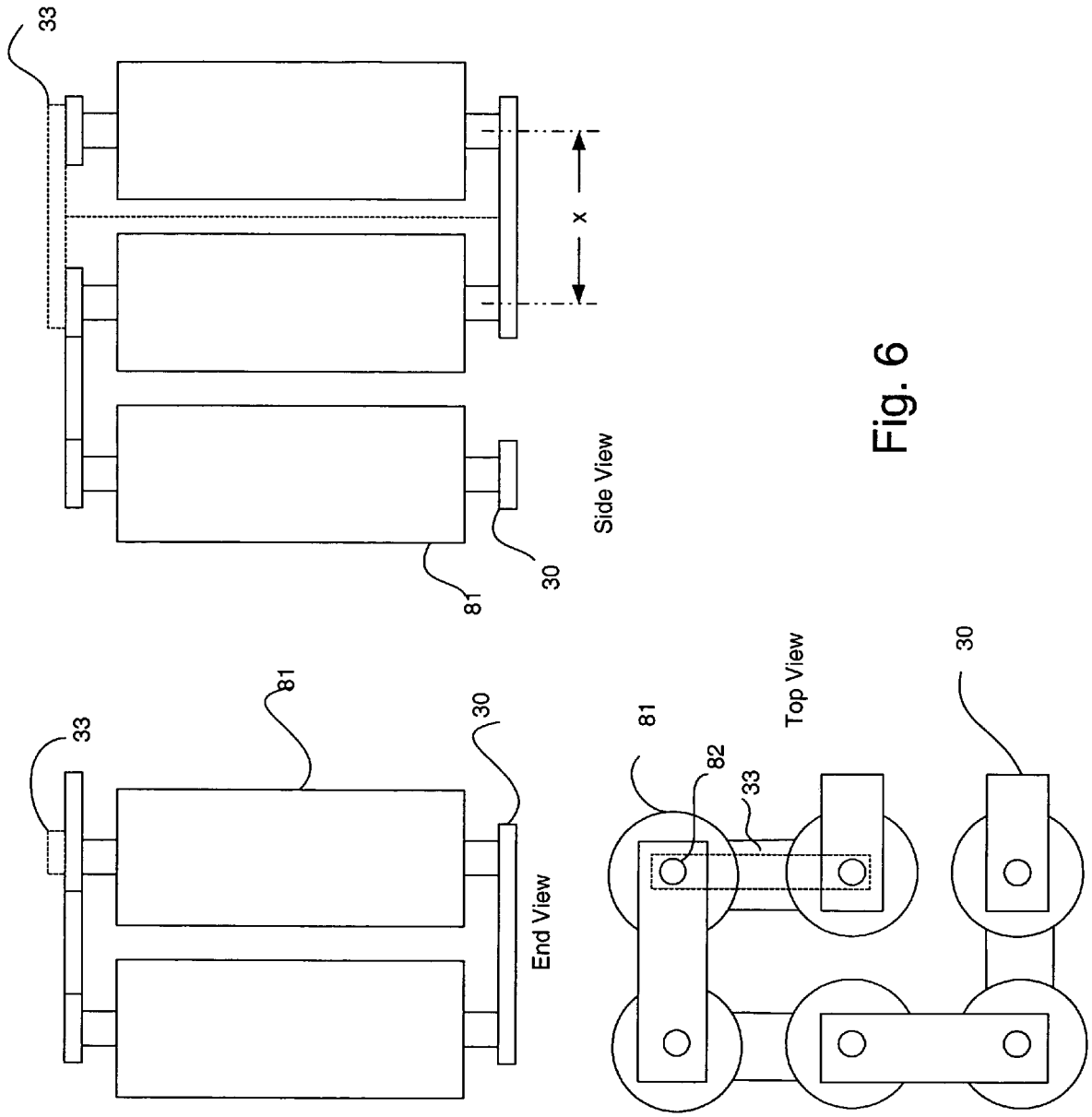

In FIG. 6 there are seen three views of six series interconnected capacitors.

Figure 7:
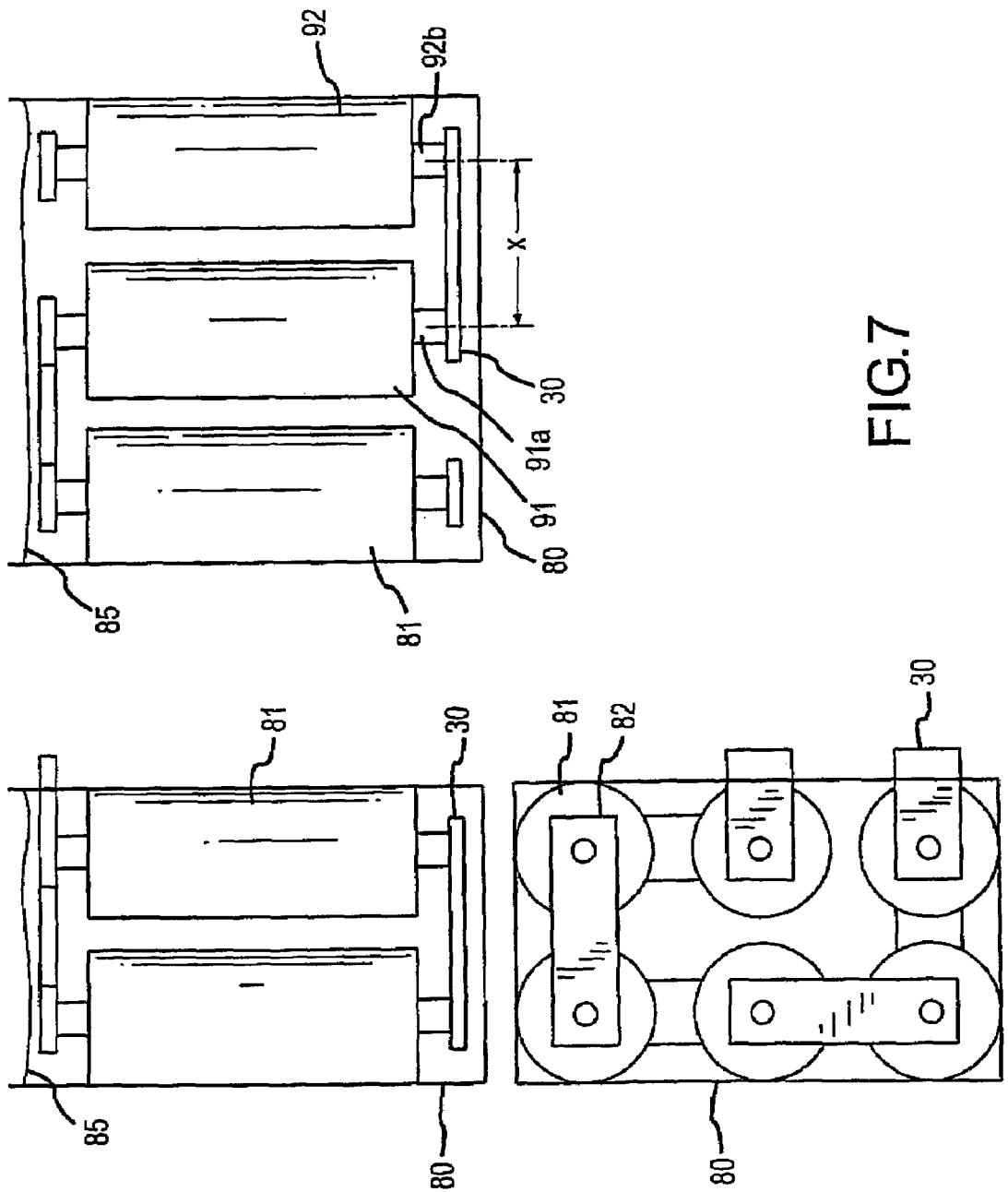

In FIG. 7 there are seen three views of six series interconnected capacitors disposed within a container.

DESCRIPTION

High capacitance capacitors can store large amounts of energy and are capable of supplying or accepting large currents. As current flow through a capacitor increases, heat may be generated. Above a certain threshold temperature or current, a capacitor may fail. The present invention addresses the tendency of capacitors to fail at higher currents and/or higher temperatures.

Referring now to FIG. 1a, there are seen capacitors connected in series. In one embodiment, four 2600 F|2.5 V|60 mm×172 mm|525 g| sealed capacitors 12, 14, 16, 18 are interconnected as a series string of capacitors. A type of capacitor capable of such high capacitance is known to those skilled in the art as a double-layer capacitor, or alternatively, as a supercapacitor or an ultracapacitor. In FIG. 1a, the series string is formed using electrically conductive interconnections 30. Interconnections 30 connect a negative terminal of a first capacitor 12 to a positive terminal of a second capacitor 14, a negative terminal of the second capacitor to a positive terminal of a third capacitor 16, and a negative terminal of the third capacitor 16 to a positive terminal 22 of a fourth capacitor 18. When a charging source 20 is connected across the positive terminal of capacitor 12 and the negative terminal of capacitor 18, a current flows through the capacitors and the interconnections therebetween. In one embodiment, it has been identified that when charged to 10 volts, over 2000 amps of instantaneous peak current may flow through the capacitors 12, 14, 16, 18, and interconnections 30. Those skilled in the art will identify that such peak current would be dependent on the particular application.

Referring to FIG. 1b, and other Figures as needed, there is seen a cross-sectional view of a double-layer capacitor. In one embodiment, a not to scale representation of a double-layer capacitor 18 illustrates a thermally and electrically conductive cylindrical housing 23, at least one electrically conductive lid 29 for sealing the housing at an end, an electrically insulative sealing portion 25 disposed between the lid 29 and the housing 23, and an electrolyte impregnated capacitor cell 27 comprised of double-layer capacitor technology known to those skilled in the art, connected to, and disposed within, the sealed housing. In one embodiment, capacitor cell 27 comprises a jelly-roll type configuration known to those skilled in the art, wherein alternating rolled collectors are electrically coupled either to the lid 29 and the housing 23. Those skilled in the art will identify that when an energy source or load is electrically connected to terminals 22, 24, current may flow between the source/load and through the capacitor 18. In one embodiment, in order to safely handle high peak current flows of about 2000 amps through the capacitor 18, as well to provide a structure that can be welded without damage, the housing 23 is sized to be about 5.25 inches in length and 2.25 inches in diameter, and the lid 29 is sized to be about 2.25 inches in diameter. In one embodiment, the wall thickness of the cylindrical portion of the housing 23 is about 1/16 inch, and a wall thickness of a bottom end portion of the housing used to connect to collectors of the cell 27 is about 3/8 inch thick. As well, a thickness of the lid 29 used to connect to the collectors of the cell 27 is about 3/8 inch. In one embodiment, the terminals 22, 24 are 5/8 inch in diameter and 7/8 inch in length. In one embodiment, one or both the terminals 22, 24 are formed at the time of manufacture of the lid 29 and housing 23, for example, by cold forming, extrusion, etc., or other techniques used for forming integral structures that are known to those skilled in the art.

In FIG. 1a there is also seen that across respective positive and negative terminals of the capacitor 12 and 14, and across respective positive and negative terminals of the capacitor 14 and 16, and across respective positive and negative terminals of the capacitor 16 and 18, a respective cell balancing circuit 32, 33, 35 is connected. A detailed description of connection, operation, and use of cell balancing circuits is discussed in commonly assigned patent application Ser. No. 10/423,708, filed 25 Apr. 2003, which is incorporated herein by reference. Because the current used by the cell balancing circuits 32, 33, 35 may be low, the circuits and substrates that they may be mounted onto need not be as robust as the interconnections 30, but as will be discussed in other embodiments later herein, a more robust substrate may nevertheless be desired. Ends of cell balancing circuits 32, 33, 35 are connected to respective terminals of capacitors 12, 14, 16, 18. Each cell balancing circuit 32, 33, 35 is also coupled by a connection to a respective series interconnection 30, as is illustrated in FIG. 1a by an interconnection 31.

Although capacitors comprising terminals disposed at opposing ends are illustrated in FIG. 1a, it is understood that capacitors 12, 14, 16, 18 could comprise other geometries, for example, with terminals that extend from the same end of a capacitor. It is therefore understood that alternative embodiments may utilize interconnections 30 and balancing circuits 32, 33, 35 that are coupled in a different orientation to that shown by FIG. 1a, and that such orientation and implementation is within the scope of the present invention. Furthermore, although only four series connected capacitors are illustrated in FIG. 1a, the scope of the embodiments and inventions described herein envisions the interconnection of less or more than four series connected capacitors.

Referring now to FIG. 2, and other Figures as needed, there is illustrated a capacitor current vs. capacitor temperature graph, wherein a series interconnection 30 between the terminals of two 2600 F|2.5 V|60 mm×172 mm cylinder|525 g| capacitors is formed by of one 0.5" W×0.125" T×4.5" L conductive bus bar interconnection. The uppermost curve illustrates that as capacitor current flow increases from 0 to about 275 amps, about a 55 degree increase in capacitor temperature is observed.

Referring now to FIG. 3, and other Figures as needed, there are seen interconnections provided with increased surface area. Those skilled in the art will identify that as current through the capacitors 12, 14, 16, 18 increases, the temperature of the capacitors and interconnections 30 through which the current flows may increase. It has been identified that a reduction in the capacitor temperature may be achieved through the coupling of a sufficiently sized thermally conductive heat dissipater material against the capacitor in a manner that sinks and dissipates heat away from the capacitor.

In one embodiment, it has been identified that interconnections 30 themselves can act as a heat dissipater. In one embodiment, each interconnection 30 is configured to comprise one or more increased surface area portion 30a. In the context of the present invention, what is meant by increased surface area (as opposed to minimized) is any surface geometry with which improved heat dissipation may be achieved. For example, if a flat surface were considered as a being minimized in surface area, any protrusion or depression would act to increase the surface area. Hence, in one embodiment, a flat rectangular bus bar type interconnection may be replaced with one that is dimensioned to include one or more ribbed portion 30a that provides an increased surface area with which additional heat may be drawn and dissipated away from the capacitors 12, 14, 16, 18. It is understood that although described and shown as ribs, an increased surface area could be provided by other geometries, for example, wings, posts, curved areas, surface roughening, and others known and used by those skilled in the art.

Referring back to FIG. 2, and other Figures as needed, there is illustrated by a middle curve that, for a given temperature, two series interconnected 2600 F|2.5 V|60 mm×172 mm cylinder|525 g| capacitors can be operated at a higher current when connected in series by a bus bar interconnection that comprises an increased surface area geometry. The middle curve illustrates that as capacitor current flow increases from 0 to about 350 amps, about a 55 degree increase in capacitor temperature is observed. Series interconnections 30 between capacitors 12, 14, 16, 18 may be thus configured with increased surface areas such that for a given temperature the current that series interconnected capacitors may be safely operated at may be increased. Similarly, series interconnections 30 with increased surface areas facilitate that for a given current, the operating temperature of a series interconnected capacitor may be reduced.

Referring again to FIG. 2, and other Figures as needed, there is illustrated by a bottommost curve, that at any given temperature, as compared to the topmost curve and the middle curve, two series connected 2600 F|2.5 V|60 mm×172 mm cylinder|525 g| capacitors can be operated at a higher current when used with an external source of heat removal. The bottommost curve illustrates that as capacitor current flow increases from 0 to about 475 amps, about a 55 degree increase in capacitor temperature is observed.

In one embodiment, an external source of heat removal comprises an airflow passing over and between the capacitors 12, 14, 16, 18, and the series interconnections 30. The external source of heat removal can be used to further reduce the temperature of the capacitors 12, 14, 16, 18. By providing an external source of heat removal, series connected capacitors 12, 14, 16, 18 may be used at higher currents and/or lower temperature in a wider range of applications and with greater reliability, than without external heat removal. It is identified that when an external source of heat removal is used with an interconnection 30 that comprises an increased surface area, further heat reduction may be achieved. Although identified as an airflow, other external sources of heat removal may also be used and are within the scope of the present invention. For example, external sources of heat removal may be provided by immersion in, or exposure to, liquid, fluid, gas, or other medium capable of safely acting to remove or dissipate heat away from the interconnections 30 and/or capacitors 12, 14, 16, 18.

Referring now to FIG. 4, and other Figures as needed, there is seen a cell balancing circuit 33 used with a circuit substrate. In one embodiment, it is identified that each cell balancing circuit, for example circuit 33, may be adapted to effectuate a further reduction in the temperature of series interconnected capacitors, for example, capacitors 14, 16. In one embodiment, circuit 33 includes one or more circuit substrate 33b portion. In one embodiment, circuit substrate 33b may comprise a thermally conductive material. In one embodiment, circuit substrate 33b may comprise a thermally and electrically conductive material. In one embodiment, wherein the circuit substrate 33b is electrically conductive, cell-balancing circuit 33 may be insulatively coupled to the circuit substrate 33b, for example, by an insulative portion 33c disposed therebetween.

In one embodiment heat dissipation circuit substrate 33b potion may be made of two or more electrically separated portions 33d, 33e, and/or 33f. In one embodiment, cell balancing circuit 33 may be thermally coupled to electrically separated portions 33d and 33e and to terminals of capacitors 14 and 16, as follows: one portion of circuit 33 is coupled to portion 33d, and a second portion of circuit 33 is coupled to portion 33e. In this manner, an appropriately selected circuit substrate 33b material, for example aluminum, can be used to draw heat away from the capacitors 14 and 16 through the capacitor terminals of capacitors 33. In one embodiment, heat dissipation circuit substrate 33b may comprise one or more increased surface area portion, for example, one or more rib, or the like.

Those skilled in the art will identify that thermal and/or electrical connection of the heat dissipation substrate 33b to the cell balancing circuit 33, as well as to terminals of capacitors 14 and 16, would need to be made in a manner so as to not interfere with the electrical operation of the capacitors and the circuit. For example, for each cell balancing circuit 33, physical contact to, and electrical insulation from, each heat dissipation substrate may be effectuated by use of an insulated portion between circuit and the heat dissipation substrate. It is understood that other thermal and electrical connections and adaptations could be made without undue experimentation, and would be within the scope of one skilled in the art.

Referring now to FIG. 5, and other Figures as needed, there is seen a capacitor housing configured to provide an increased surface area. It is identified that a capacitor 55 housing may also be adapted to effectuate reduction of the temperature of the capacitor. For example, in one embodiment, a capacitor 55 may comprise one or more increased surface area portion, for example, one or more rib 55b, or the like. When used in combination with other embodiments described herein, the increased surface area portions illustrated by FIG. 5 would allow for even more dissipation of heat away from the capacitor 55.

Referring now to FIG. 6, and other Figures as needed, there are seen in a top, end, and side view, six series interconnected capacitors. Although six series interconnected double-layer capacitors 81 are represented in FIG. 6, it is understood that the principles described herein could be extended to fewer or more capacitors. For example, wherein 42 volts was a desired working voltage, a greater number of double-layer capacitors may be connected in series; for example, sixteen 2.5 volt rated capacitors could be connected in series.

As illustrated in FIG. 6, capacitors 81 are interconnected by bus bars 30. In accordance with principles described herein, it is understood that in one embodiment, bus bars 30 may comprise one or more increased surface area portion (not shown in FIG. 6). In some embodiments, bus bars 30 may comprise attachment points or holes whereat the bus bars may be coupled to terminals of the capacitors by compression or expansion fittings, bolts, screws, or other fasteners as are known to those skilled in the art. Those skilled in the art will identify that if bus bars 30 and/or terminals made of aluminum are used, a thin oxide layer may exist or be formed thereupon such that contact resistance therebetween may be increased. It is identified that coupling of bus bars 30 to terminals of capacitors 81 using fasteners may not provide sufficient coupling force to break through the oxide and/or prevent its formation thereafter. When current flows through an increased contact resistance, the temperature of the terminals may become increased. As the current is increased, for example, at the high currents that double-layer capacitors are capable of being used at, the temperature of the terminals and, thus, the capacitors 81 could be increased even further.

In one embodiment, better contact and lowered resistance path for current flow and, thus, reduced heat generation, is achieved when bus bars 30 are welded directly to respective terminals of capacitors 81. As used herein, the term welding is intended to mean coupling of bus bars 30 to terminals of capacitors to thereafter form an integral structure that is made of the bus bars and terminals, and depending on welding technique used, possibly an additional welding material. During the formation of the welded structures, it is identified that the surface-to-surface contact and, thus, the increased resistance caused by oxide layers would be substantially reduced or eliminated. Welding can be preferably effectuated by laser welding, ultrasonic welding, cold forming, or other welding techniques such as gas metal arc welding, gas tungsten arc welding, shielded metal arc welding, brazing soldering, etc, as are known by those skilled in the art.

In one embodiment, prior to welding of bus bars 30 to respective terminals, capacitors 81 are placed into a holding fixture so as to maintain the terminals of the capacitors in a fixed orientation and separated by a desired fixed distance (illustrated as "x"). In one embodiment, the desired fixed distance is the same or similar distance as between bus bar 30 attachment points. By making the desired fixed distance between the terminals the same as the distance between bus bar attachment points, the bus bars 30 may be quickly and accurately aligned to the terminals of the capacitors during one or more manual or automated weld step. In one embodiment, bus bar 30 attachment points may comprise openings, voids or holes 82. In one embodiment, circular holes 82 are sized to slideably fit over the outer diameter of capacitor 81 terminals. In one embodiment, capacitor 81 terminals may be disposed through holes 82 in a manner such that the bus bars 30 and the terminals can be easily accessed by welding apparatus from a direction external to the structure capacitors 81. In one embodiment, after welding to the capacitor 81 terminals, it is understood that a rigid or semi-rigid integrally formed self-supporting structure comprised of bus bars 30 and the capacitors is created.

Those skilled in the art will identify that welding to form an integral structure not only reduces the formation of oxides and oxide layers, but as well, facilitates ease of manufacture. For example, it is identified that the weld or weld like joints formed between the bus bars 30 and the terminals minimizes movement of the capacitors 81 and their interconnections relative to one another. Because after welding the structure is self-supporting, movements that can degrade the physical and electrical connections made between bus bars 30 and capacitors 81 can be minimized thereafter. In one embedment, as compared to the prior art, it is identified that a self-contained self-supporting module of capacitors capable of dissipating heat generated by high currents can be provided without necessarily needing to be fixidly mounted in, or encapsulated by, a protective housing. It is further identified that when terminals of capacitors are axially disposed, welded bus bars 30 can be used to provide structural stability at both a top and bottom of the resultant self-supporting structure, which may provide better stability than when capacitors with radially disposed terminals at one end (not shown) are used. In FIG. 6, one of five possible balancing circuits 33 is represented by dashed lines. In one embodiment, in accordance to principles described with FIG. 4, a circuit substrate 33b portions of balancing circuits 33 could also be coupled to terminals of capacitors 81 by fasteners or, if desired, by welding. When welded, it is identified that the balancing circuits 33 could provide further structural and electrical integrity to the resultant structure formed by the bus bars 30 and the capacitors 81.

Referring now to FIG. 7, and other Figures as needed, there is seen a transparent view of a container and series interconnected capacitors therein. In some embodiments, it may be desired to use a sealed container 80 to encapsulate the capacitors 81 illustrated in FIG. 6. In one embodiment, the sealed container 80 may be filled with an external heat removal medium 85, for example, an oil or an alcohol. The external heat removal medium can be used to facilitate the transfer of heat away from the capacitors 81 and bus bars 30 to the walls of the container 80 preferably without electrically or chemically affecting the performance of the capacitors 81. It is identified, however, that dimensional requirements of the container 80 may limit the configuration and potential use of some of the heat reduction principles and embodiments described previously herein and, thus, one or more of the features described by previous embodiments may or may not be able to be fully or even partially adapted for use within a sealed container 80. For example, in one embodiment, wherein there are six 2600 F|2.5 V|60 mm×172 mm cylinder|525 g| capacitors interconnected by welded bus bars 30 and cell balancing circuits (not shown), to effectuate fitment in the desired dimensions of a container 80, one or more of the bus bars 30, cell balancing circuit substrates, and capacitors 81 may be configured with minimized or no increased surface area portions (i.e. flat or smooth surface areas).

It is identified that bus bars 30 and the capacitor terminals they are welded to preferably comprise materials that minimize well known electro-chemical and galvanic effects that can occur when dissimilar metals are placed in contact with each other. Accordingly, similar metals may be used for capacitor terminals 91*a*, 92*b* and bus bars 30 and, possibly, as well, for the capacitor housing and lid. Thus, if terminals 91*a*, 92*a* of respective capacitors 91, 92 are aluminum, in one embodiment the bus bars 30 are preferably also made of aluminum.

Prior to use of the welded bus bars 30 of the present invention, when fasteners were used to connect bus bars to terminals, it was desired that the bus bars and fasteners maintain their geometrical structure under pressure and/or high temperature, for example, as when a bus bar was forced against a terminal by a screw type fastener. Under high pressure connection forces, those skilled in the art will understand that some bus bars could flow or change their shape, for example, as could occur if bus bars comprised of common grade aluminum were used. Those skilled in the art will identify that over time a change in shape or geometrical structure could increase the resistivity at an interconnection point between a terminal and a bus bar, for example, by an increased spacing between a bus bar and terminal. To this end, with aluminum bus bars attached to aluminum terminals by fasteners, high-grade metal aluminum that does not flow or change its geometry easily under pressure has been used. For example, in one embodiment, a 4047 grade of aluminum, or other similar non-ductile high grade metal, is used when aluminum fastener type metals and interconnections are used. Those skilled in the art will identify that use of such high-grade metals, however, may result in higher manufacturing costs being incurred.

With the welded bus bars of the present invention, because high-pressure type fasteners and connections need not be used, high-grade metal bus bars are not necessarily required. Because with the present invention lower or common grade metal may be usable as a material for bus bars 30, as well, as for the terminals, housing, and the lid, a reduction in the cost of manufacture of double-layer capacitors, as well as interconnected modules, made therefrom, may thus be possible.

A product comprising one or more double-layer capacitor 81 interconnected by welded bus bars 30 may be provided for use in many different applications. For example, one or more interconnected capacitor 81 may be used as a primary or secondary energy source for a vehicle. Because the welded combination of double-layer capacitors 81 and bus bars 30 may be used to create a structure that is self-supporting and self-contained, the capacitors 81 may be mounted in many more physical orientations than previously possible. In one embodiment, conventional batteries in a hybrid vehicle may be replaced by, or supplemented by such a structure as described herein. In contrast to typically used automotive batteries, because each individual capacitor 81 housing is sealed, the capacitors may be mounted without use of an encapsulating enclosure, as well as in many different orientations, for example, up, down, sideways, etc.

While the particular systems and methods herein shown and described in detail are fully capable of attaining the above described object of this invention, it is understood that the description and drawings presented herein represent some, but not all, embodiments of the invention and are therefore representative of the subject matter which is broadly contemplated by the present invention. For example other dimensions, other form factors, other types of capacitors and other energy storage devices could be adapted and used with one or more principles disclosed herein. Thus, the present invention should be limited by nothing other than the appended claims and their legal equivalents.

The invention claimed is:

1. A capacitor based system, comprising
at least three double-layer capacitors, the capacitors comprising terminals through which a high current may flow safely; and
at least two bus bars, each bus bar comprising two attachment points, wherein at the two attachment points a double-layer capacitor and the bus bar form an integral structure that passes the high current,
wherein the at least three capacitors and the at least two bus bars comprise a self supporting-structure and the at least three double-layer capacitors are connected in series by the at least two bus bars.

2. The system of claim 1, wherein the high current is greater than 2000 amps.

3. The system of claim 2, wherein the at least one bus bar comprises a relatively ductile metal.

4. The system of claim 2, wherein at least one bus bar comprises an increased surface area.

5. The system of claim 4, wherein the increased surface area comprises one or more rib.

6. The system of claim 1, wherein the system comprises a vehicle, the vehicle comprising an electrical device, wherein two of the terminals are coupled to the electrical device.

7. The system of claim 1, wherein the at least three capacitors provide about 42 volts when charged.

8. The system of claim 1, wherein two capacitor balancing circuits are interconnected between terminals of the at least three capacitors.

9. The system of claim 1, wherein the self-supporting structure comprises welds.

10. The system of claim 9, wherein the welds are laser welds.

11. The system of claim 9, wherein the welds are ultrasonic welds.

12. The system of claim 9, wherein the welds are cold formed.

13. The system of claim 1, wherein two terminals are disposed along one axis of each double layer capacitor.

14. The system of claim 1, wherein the terminals and the at least two bus bars comprise the same metal.

15. A capacitor structure, comprising:
a plurality of capacitors; and
a plurality of bus bars for carrying a current between the plurality of capacitors,
wherein the plurality of bus bars and the plurality of capacitors form an integrally interconnected self-supporting structure in which the plurality of capacitors are connected in series by the plurality of bus bars.

16. The structure of claim 15, wherein one or more of the bus bars comprise an increased surface area.

17. The structure of claim 15, wherein the bus bars are welded to the plurality of capacitors.

18. The structure of claim 17, wherein the current is at least 250 amps.

19. The structure of claim 17, wherein the capacitors are double-layer capacitors.

20. The structure of claim 15, wherein the capacitors comprise terminals and the integral interconnected structure is comprised of the bus bars and the terminals.

21. The structure of claim 20, wherein the capacitors comprise an aluminum housing and aluminum lid, wherein the housing and lid each comprise a terminal.

22. The structure of claim 15, wherein the self-supporting structure includes at least one capacitor balancing circuit connected between two of the capacitors.

23. A capacitor based system, comprising:
at least two double-layer capacitors, the capacitors having axially disposed terminals through which current may flow safely; and
at least one bus bar, the bus bar comprising two attachment points, the at least one bus bar for carrying the current between the double-layer capacitors, the at least one bus bar welded at the two attachment points to respective terminals of the double-layer capacitors,
wherein a charge balancing circuit is electrically interposed between the respective terminals of the double lever capacitors.

24. The system of claim 23, wherein the at least one bus bar comprises at least one void within which one of the terminals is disposed.

25. A capacitor based system, comprising
at least three double-layer capacitors, the capacitors comprising terminals through which a high current may flow safely; and
at least two bus bars, each bus bar comprising two attachment points, wherein at the two attachment points a double-layer capacitor and the bus bar form an integral structure that passes the high current,
wherein the at least three capacitors and the at least two bus bars comprise a self supporting-structure and at least one bus bar comprises an increased surface area.

26. The system of claim 25, wherein the increased surface area comprises one or more rib.

27. A capacitor based system, comprising
at least three double-layer capacitors, the capacitors comprising terminals through which a high current may flow safely; and
at least two bus bars, each bus bar comprising two attachment points, wherein at the two attachment points a double-layer capacitor and the bus bar from an integral structure that passes the high current,
wherein the at least three capacitors and the at least two bus bars comprise a self supporting-structure and two capacitor balancing circuits are interconnected between the terminals of the at least three capacitors.

28. A capacitor based system, comprising
at least three double-layer capacitors, the capacitors comprising terminals through which a high current may flow safely; and
at least two bus bars, each bus bar comprising two attachment points, wherein at the two attachment points, double-layer capacitor and the bus bar form an integral structure that passes the high current,
wherein the at least three capacitors and the at least two bus bars comprise a self supporting-structure and the terminals and the at least two bus bars comprise the same metal.

* * * * *